US006342952B1

(12) United States Patent
Chan

(10) Patent No.: US 6,342,952 B1
(45) Date of Patent: Jan. 29, 2002

(54) METHOD FOR MATCHING PRINTING INK COLORS

(75) Inventor: Domingo Q. Chan, Richmond Hill (CA)

(73) Assignee: Flint Ink Corporation, Ann Arbor, MI (US)

( * ) Notice: Subject to any disclaimer, the term of this patent is extended or adjusted under 35 U.S.C. 154(b) by 0 days.

(21) Appl. No.: 09/416,164

(22) Filed: Oct. 11, 1999

(51) Int. Cl.$^7$ .............................. B41B 15/00; G01J 3/46; G09G 5/02
(52) U.S. Cl. ..................... 358/1.9; 356/402; 356/425; 345/593; 345/748
(58) Field of Search .................... 358/1.1, 1.6, 1.9, 358/1.13; 399/54; 345/593, 594, 595, 700, 733, 737, 740, 748, 326–358, 961–978; 356/402, 425

(56) References Cited

U.S. PATENT DOCUMENTS

| 4,887,906 A | * | 12/1989 | Koehler ................... 356/402 |
| 4,970,584 A |   | 11/1990 | Sato et al. .................. 358/518 |
| 5,668,633 A | * |  9/1997 | Cheetam et al. ............. 356/402 |
| 5,720,017 A | * |  2/1998 | Cheetam et al. ............. 345/595 |
| 5,740,078 A | * |  4/1998 | Cheetam et al. ............. 356/402 |
| 5,841,421 A | * | 11/1998 | Cheetam et al. ............. 345/593 |
| 5,897,239 A |   |  4/1999 | Caruthers, Jr. et al. ....... 399/54 |
| 5,907,495 A | * |  5/1999 | Snyder et al. .................. 703/6 |
| 5,909,291 A |   |  6/1999 | Myers et al. ................ 358/523 |
| 5,945,112 A |   |  8/1999 | Flynn et al. ................ 424/401 |

FOREIGN PATENT DOCUMENTS

| DE | 195 06 425 A1 | 8/1996 |
| EP | 0 136 897 A2 | 4/1985 |
| EP | 0 587 128 A1 | 3/1994 |
| EP | 0 915 615 A2 | 5/1999 |
| GB | 2 071 573 A | 9/1981 |

\* cited by examiner

Primary Examiner—Kimberly A. Williams
(74) Attorney, Agent, or Firm—Harness, Dickey & Pierce P.L.C.

(57) ABSTRACT

A system is provided that includes a first computer that can communicate with a second computer. The second computer sends information to the first computer that includes a desired ink color and optionally includes information of other desired ink properties. The first computer includes a database of data for predicting color data of ink formulations using a selected ink base color set, a software program for selecting an ink formulation based on data for a desired ink, and a software program for sending information to the second computer to display the color of the selected ink formulation on a color monitor connected to the second computer. The ink base color set can be selected to provide other desired properties for the ink, such as low cost, light fastness, or chemical resistance.

19 Claims, 3 Drawing Sheets

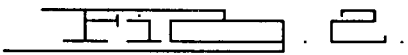

Color Information Form

SPECIFIC JOB INFORMATION

Date: _____   Color Match: ☐   Ink Standard: ☐

Customer: _____   Contact: _____

Telephone Number: _____

INK REQUIREMENTS:

Type:   Offset ☐   BF ☐   UV ☐   Flexo ☐   Gravure ☐   Waterbase ☐   Solvent base ☐

Ink Quantity        Ink Description

Quantities:   kg ☐   lbs. ☐   Ink Container:

Resistance Needed:   Heat _____   Rub _____   Chemical _____   Other: _____

Coating:       Yes ☐       No ☐       In-line ☐   Off-line ☐

Type:       Aqueous ☐       UV ☐       OPV ☐

For Specific Coating or Varnish Product:

JOB STOCK:

Product Name _____   Coated ☐   Uncoated ☐   Base Wt.

Other Information

INK REQUIRED:

Date :

COMMENTS:
List any comments below.

511 MILLWAY AVENUE, CONCORD, ONTARIO CANADA L4K 3V4
TEL: (905) 660-0360     FAX: (905) 660-0364
EMAIL: ccolorlab@flintink.com

ColorTools QC – [Flint Ink Test Screen]

Std Bat System Forms Plots Instrument Illum/Obs Windows

| Std Inst Avg | Bat Inst Avg | FLINT HOST | HOST PRINT | Calibrate All | QC LIQUID | LIQUIDINK C OF A |

Standard Name 1 of 8

Carn Red

[New Std] [Retrieve Std] [List Std] [Store Std]

Batch Name 1 of 1 match

[New Bat] [Retrieve Hist] [List Bat] [All Bats to Hist]

[CALIBRATE]  [EVAL Color]

[Auto Send] [Export STD/BAT]
[Send Desktop] [Export Desktop]
[Send STD] [Import Desktop]

STD   BATCH

Flint Ink

Date: 08-Jun-99    Time: 11:54:59

Batch Is:  lighter
           more red
           more yellow

Batch Strength: 75.77%

Decision: Fail

| Ill/Obs | DL* | Da* | Db* | DC* | DH* | DE* | DE cmc |
|---|---|---|---|---|---|---|---|
| D65 10 Deg | 3.14 | 0.56 | 0.68 | 0.81 | 0.34 | 3.27 | 1.55 |
| A 10 Deg | 3.22 | 1.14 | 0.62 | 1.28 | -0.20 | 3.47 | 1.49 |
| F11 10 Deg | 3.35 | 1.47 | 1.31 | 1.96 | 0.22 | 3.89 | 1.66 |

[Print Form] [Close All] [Eval Color] [AB QC] [CIELab DE Plot] [Data Match]    [CIELab DE Plot]  [%R (%) Plot]

FIG. 3.

METHOD FOR MATCHING PRINTING INK COLORS

FIELD OF THE INVENTION

The invention generally relates to printing ink manufacturing processes. In particular, the invention concerns an interactive system for color approval by communication with remote locations and supplying printing inks to remote locations for printing uniform colors.

BACKGROUND OF THE INVENTION

Many companies seek to capitalize on having a national or international presence by promoting to their customers the advantages of a supplier that can provide a product or service of uniform quality anywhere in the country or the world from its network of locations. A national or international company may also seek to foster an image of increased service and superior research based upon the combined and complementary efforts of groups separated geographically but working together to meet the customer's needs.

One tool that can be effective to portray an international but unified market presence is the adoption of a uniform look for labeling and product literature. While the company that seeks a uniform look has a national or international business, the printing is typically done on a local scale by different small, independent printers. The labels, product brochures, or other printed articles may then have color variations from location to location, or even for different printing runs because of error introduced by subjective color matching methods, by slightly different color standards, by different equipment and different printing conditions, and so on. The colors of printed materials can also vary because they are printed by different processes, for example by a lithographic process or by a gravure printing process. Different kinds of printing inks, for example heat-set inks or drying inks, could also be used, depending upon the particular printer. Such differences in the printed materials detracts from the desired image of a national or global company with a strong, unified effort.

For these reasons, it would be desirable to have a method of assuring the closest match in color and quality, regardless of where geographically the article is printed.

SUMMARY OF THE INVENTION

The present invention provides a system that enables the buyer of printed materials ("print buyer") to obtain printed materials that have matching print colors, even when the inks are manufactured at different locations and the materials are printed by different printing companies and at distant locations, and even when the printing is done using different printing processes.

The present invention further provides a computerized system with remote access capabilities for identifying a desired ink color and a formulation for a matching ink color based upon a given set of available ink base colors. The desired ink color is identified using the spectral data or other data to define the desired color, an interface for comparing the color standard with the selected ink color for the customer's approval, an optional procedure for adjusting the ink color (and the formulation for the ink color) based upon input from the customer, and optionally a link to a dispensing system having the ink base colors of the formulation for mixing the color bases of the formulation to make the ink.

In a preferred embodiment, the generated ink formulation is identified with the print buyer code or with a product code for producing additional ink batches for the same or for another printer who prints materials for that print buyer.

In another aspect, the invention provides a method for identifying a desired print color on a computerized system with remote access capabilities in which a desired ink color is input to a color matching program, being converted first, if necessary, to the coordinates that the color matching program will use. The color matching program uses the desired color data, and optionally other data such as information relating to the type of ink desired, to determine a formulation for a color-matched ink. The formulation can then be transmitted electronically to manufacturing equipment where the ink is produced according to the generated ink formulation. The computerized system preferably identifies the input color and the generated ink formulation with the print buyer so that additional ink batches of identical color can be prepared.

BRIEF DESCRIPTION OF THE DRAWINGS

FIG. 2 is an informational screen that conveys the results of the electronic color match in one embodiment of the invention;

FIG. 3 is a screen of a graphical user interface in one embodiment of the invention.

DETAILED DESCRIPTION OF THE INVENTION

Figure 1:
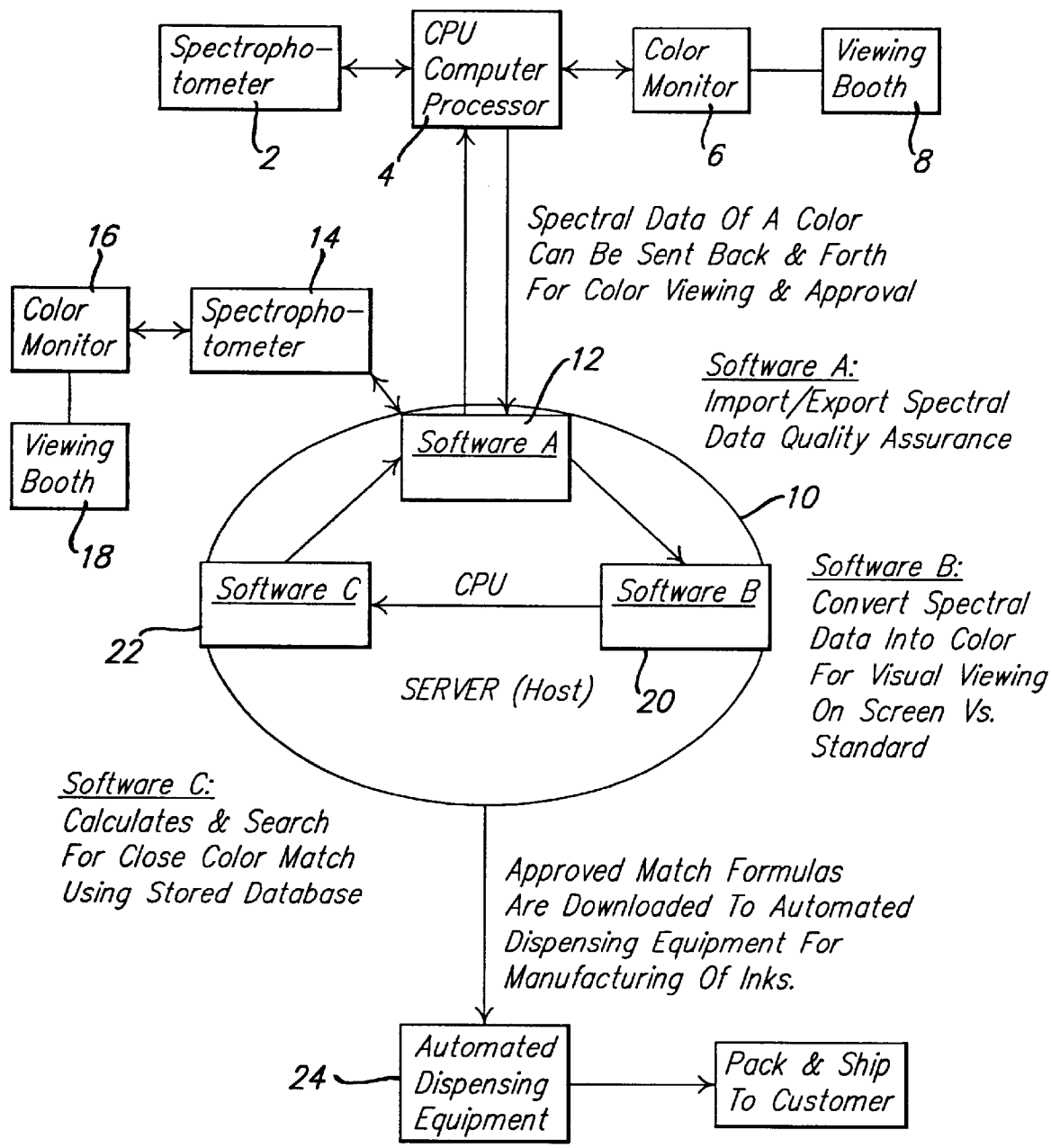
FIG. 1 is a block diagram of one preferred embodiment of the system of the invention.

Using the computerized system with remote access capabilities, each of the color selection, selection of an ink formula matching the selected color, color match approval, and ink manufacturing components can be remotely located but still controlled to produce printing of uniform quality and color. By "remote" it is meant that a location is located at a different site. The color approval process is carried out by computer communication. The advantage of the invention, as will be apparent from the following description, is that the locations for inputting the desired color, for matching the desired color to an ink formulation, and for manufacturing the ink according to that formulation can be located in different parts of the world, and yet the system of the invention can carry out the process from the initial input of the desired color through manufacture of the ink in a day or even in hours.

In one aspect, the process and system of the invention may be illustrated by reference to FIG. 1. In the embodiment shown in FIG. 1, a remote location includes a spectrophotometer 2, a first computer (central processing unit) 4, a color monitor 6 electronically connected to the computer, and a viewing booth 8. The spectral data of a color sample of the desired color is obtained using the spectrophotometer 2. The color data for the desired color is input into the computer 4, which transmits the data to a second computer 10.

In the illustrated embodiment, the second computer is designated as a server or host computer, but all that is required is that the first and second computers be able to communicate with one another. The invention is not limited to client-server relationships, and it can readily be seen that other relationships are possible that will allow communication between the first computer and the second computer. The invention thus relies on a communications system, such as a global communication network. One such global communication network is the Internet (based on the Transmission Control Protocol/Internet Protocol, or TCP/IP). Using such communication each printer-customer can view color matching results. In a preferred embodiment, the system uses an Internet (i.e., TCP/IP) graphical user interface for interacting with individual printer customers, print buyers, packaging designers, and others for whom such ink color matching is desirable. The system also preferably includes as the second computer an Internet (TCP/IP) second computer or server that interacts with the customer via the customer's first computer or client interface. The customer (whether printer, designer, or print buyer) can input the ink color and type and/or verify the color identified by the system and displayed on the customer's monitor 6. These functions may be provided by either server side programs (via the Common Gateway Interface) which accept the information input by the customer or by a client side applet (e.g., Java), which is a program downloaded to a client that executes in the customer's computer environment.

In one aspect of the invention, the server can handle numerous simultaneous requests. The server can pass the customer information and selected ink formulation information to a manufacturing facility selected by the server according to established guidelines. The guidelines may include, for example and without limitation, proximity to the customer's print shop, whether the manufacturing facility has the necessary materials for the ink formulation in inventory or will have those materials in time to meet the customer's needs, and capacity of the manufacturing facility.

The second computer 10 (illustrated as the server) selects an ink formulation and transmits the color data associated with the selected formulation to the first computer 4, where the color of the selected ink formulation can be viewed on color monitor 6 and approved by the customer at the remote location. The color of the selected ink formulation can be viewed under different lighting in the viewing booth 8, for example daylight D65, cool white fluorescent, and incandescent lighting.

The server 10 uses three software packages, 12, 20, and 22, to select an ink formulation to match the desired color. Software package A 12 moves information back and forth between other components of the system. Spectrophotometer 14, color monitor 16, and viewing booth 18 are used in two ways. First, they are used create a color database associated with a set of ink base colors for manufacturing the ink, or for modifying or updating the database to reflect changes or additions to the ink base color set. Secondly, they are used for monitoring the results of the ink color selection so that the manufacturer can view the same results seen by the person at the remote location.

Software package B 20 converts the spectral data of a color that is input from the computer 4 or the database software 22 to the digital information that will produce the same color on the screens of monitor 6 and 16.

Software package C 22 includes a database of color information for the ink base color set that will be used to manufacture the ink. Software package C 22 uses the database information to select an ink formulation that will produce a printed ink having the closest color match to the desired color, within any other parameters specified. Other parameters that the software C 22 may take into account include selection of a least expensive formulation having no more than a specified color difference $\Delta E$ compared to the desired color, selection of a formulation that will have a given chemical resistance, selection of a formulation using on light-fast ink color bases, and so on. Basically, color matching involves duplicating, as closely as possible for given formula constraints, the spectral curve for the color in the visible light spectrum of 400 to 700 nm. The color matching is described in more detail below.

When the selected color has been approved by the customer at the remote location, the customer can send the approval from computer 4 to the server 10 for manufacturing the ink. The server 10 then transmits the formulation data to the automated dispensing equipment 24. The automated dispensing equipment 24 dispenses and mixes the ink color bases designated in the ink formulation to produce the ink. The ink is then packaged and shipped to the printer.

In a first step of the process, the printer-customer inputs information about the desired printing ink needed and other information that may be related to ordering the printing ink. Although the information could be sent by the customer through other means, such as telephone or telefacsimile, to be entered into the second computer or server, the information is preferably input via a graphical user interface by the customer and transmitted from the first computer (client) to the second computer (server). One example of an interface for entering information is shown in FIG. 2. The information input by the customer includes the specific color needed and the identity of the printer, and preferably also includes the identity of the print buyer for which the printing is being done. Additional information regarding an order of the ink may also be input, for example the volume of ink needed, mode for shipping, the customer's location, and the customer's authorization of payment.

It is especially preferred to include additional information relating to the print substrate, printing equipment, and other information that may affect the color match on the substrate or performance of the ink. Examples of such information include, without limitation, type of substrate, color of substrate, print process (e.g., offset, gravure, sheetfed, flexographic, etc.), type of printing equipment, press speed, and/or type of ink or ink properties desired (e.g., UV curing, chemical resistant, solvent based or water based, air dry, heatset, etc.).

It is also possible to input information from two or more separate locations. For instance, the color spectral data can be obtained and input at one location and other information can be input from a second location, so long as the information from both locations is identified as belonging to a single order file.

A variety of methods for inputting the desired color is envisioned. In one embodiment, the desired color may be input as appropriate coordinates of a color space. The color coordinates can be obtained spectrophotometrically for example using a reflection spectrophotometer, and expressed in coordinates such as the color coordinates such as X, Y, Z or L*, a*, b*, or in cylindrical coordinates r, $\theta$, l or L*, C*, H*. The color coordinates can be input directly from the spectrophotometer, entered by a keyboard, using a mouse or track ball, or otherwise. Although the color can be measured using other instruments, such as a colorimeter, such methods are more limited and more accurate color matching can be obtained using a spectrophotometer.

In a second embodiment, the color can be selected from a library of colors shown on the customer's computer monitor. The customer can select potential colors by using an electronic input device. Any electronic input device can be used in connection with the appropriate software, including, without limitation, keyboard, mouse, track ball, light pen, electronic tablet, touch screen, voice recognition device, and so on. The colors may be shown as an array of color chips or boxes, as a continuum of colors such as a color space, or in any other suitable way. For example, the color may be selected from the colors that can be displayed by a monitor, with the digital identity of the selected color being transmitted for color matching to the component of the invention that determines the ink formulation for the closest color. In one preferred embodiment, the chosen color occupies a larger portion of the viewing area in a new screen so that the customer can compare the selected color to a color standard and verify the color choice.

In a third embodiment, the desired color is input by scanning in a color standard using a scanner with accurate color reproduction capabilities, by photographing the color with a digital camera, and so on. The input color may be displayed on the terminal screen.

In yet another embodiment, the desired color can be specified by reference to a color in a color guide or swatch book of different colors, such as the color guide published by Pantone, Inc. of Carlstadt, N.J. in the Pantone® Color Formula Guide. A database containing color data defining each color can be accessed, and the color data for the specified color may then be used as before to determine the formulation with the closest matching color for the given set of ink color bases.

In a variation of the process, a customer can input a code assignment for a color that has already been matched. Thus, once a print buyer selects a color, the color is matched and assigned a unique code the first time it is used in the process, and thereafter the same color may be selected (by the first printer or by any later printer) by inputting the unique code only without further color matching steps.

In making a color match, the server accesses a color match routine to produce an ink formulation of the specific color. The color match routine compares the color information input from the customer to the color information in a database containing data for the ink base colors for ink color bases from which the ink will be prepared and selects the proper proportions of the ink color bases to achieve a closest color match. The database is prepared by measuring the color information for print samples prepared from the ink color base set and/or combinations thereof at different concentrations or strengths. The database contains a sufficient number of color information points so that the computer can extrapolate, if necessary, the color information that would result from the different combinations of the ink base color set. In other words, the computer calculates a synthesized spectral curve or other color information for the ink formulation based on the color information for the different concentrations of each ink base color.

The color information used to prepare the color matching database can be obtained by the proofing procedures typically used for inks, such as with the use of an IGT proofer, measuring the color information preferably with a reflection spectrophotometer.

In general, color matching can be carried out in different ways, with some ways capable of providing more accurate results. First, the second computer can compare the spectral curve in the visible region of the desired color to the spectral curves of possible ink formulations and select the ink formulation or formulations having spectral curves closest to that of the desired color. The comparison can be done using standard curve fitting techniques, for example least squares fit. In a second color matching technique, the desired color can be expressed in coordinates in color space, such as CIE coordinates L*a*b*, L*C*H*, or L*u*v*. When the color coordinates are used in color matching, an established color tolerancing method can be used to calculate the color differences between two points. CIELAB is one common color tolerancing method that calculates the color difference $\Delta E$ as $$\Delta E = \mathrm{Sqrt}[(a_1^* - a_2^*)^2 + (b_1^* - b_2^*)^2 + (L_1^* - L_2^*)^2]$$

In the CMC tolerancing method, the color difference $\Delta E$ is calculated using an ellipsoid around the standard color with semi-axes corresponding to hue ($S_H$), chroma ($S_C$) and lightness ($S_L$):

$$\Delta E = \mathrm{Sqrt}[(\Delta L^*/lS_L)^2 + (\Delta C_{ab}^*/cS_C)^2 + (\Delta H_{ab}^*/S_H)^2]$$

With the lightness factor l being 2 and the chromaticity factor c being 1. An example of a program for comparing a desired color to determine optimum color match is the COLORITE brand color matching software of Datacolor, Lawrenceville, N.J. The CIELAB color coordinates can be computed from a full reflection spectrum using formulas published by CIE (Commission Internationale de l'Eclairage). Instruments such as the X-Rite 938 spectrodensitometer available from X-Rite, Grandville, Mich. also exist which directly provide CIELAB coordinates.

Because print color can appear different when viewed under different light sources, it is preferred to include in the database color information for the colors as they would appear under different light sources, for example in sunlight, in D65 Daylight, cool white fluorescent light, and incandenscent light. The color information of the desired ink color can then be input for each of the different light sources, and the color match can be made by determining the lowest $\Delta E$ when taking into account the color of the ink for all of the different light sources.

The color match can also be determined by the comparison of the reflectance values in the visible spectrum for the desired color and the color identified by the color matching program. A least squares calculation can be done to determine the ink formulation that will have the spectral curve with the closest fit to the spectral curve of the desired color standard, where the spectral curve for the ink formulation may be extrapolated from information of measured spectral curves in the database.

The color of the selected formulation can be displayed on the customer monitor for approval by the customer. In this context, the "customer" can be the printer and/or the print buyer and/or a designer of packaging or other printed media. For example, the color of the selected formulation can be displayed on a half-block next to a half-block displaying the color input by the customer or in a color window shown on the monitor screen with other data. One example of such a screen is shown in FIG. 3. In approving a color, the customer can compare the desired color and the selected ink color shown on screen under each of the different light sources. Alternatively, the second computer can transmit a display showing how the desired color and selected ink color will compare under different lighting conditions.

In order for such a display to be successful in showing the results of a the calculation of a color match for the ink color base set, the display must be able to faithfully reproduce the colors. It is known how to calibrate the colors on a monitor to accurately display the selected colors on the monitor. Commercial calibration systems are available, for example, from X-Rite, Inc., Grandville, Mich. and from Datacolor, Lawrenceville, N.J. Generally, such calibration involves using standard tiles with known reflectance values.

In the same way, the results of the color matching process can be sent to the customer in different forms for color approval. First, the color of the selected ink formulation and the desired color can be displayed side by side on the monitor. The color monitor 6 must be properly calibrated so that it accurately displays the color of the selected ink formulation and the desired color that is being matched. The colors displayed on the color monitor 6 can be viewed under different lighting by employing the viewing booth 8 with variable lighting. Alternatively, the second computer 10 can electronically calculate how each color would appear under the selected different lighting, and send to the first computer results that display the desired color and the color of the selected ink formulation for each of the lighting conditions selected.

The customer can approve the color shown or request that the color be modified. For example, the customer can send a request back to the color matching program requesting that the color be made lighter, and then view the results of that request. The results can be returned to the customer for viewing and approval within minutes, as compared to the days that it takes to manually prepare a new ink color, print the ink in a proof, and deliver the proof to the customer.

Alternative criteria can be established to select an ink formulation to meet the printer's or print buyer's needs. For example, instead of selecting the closest color match possible, the system can determine the lowest cost formulation that has a reasonably close color match, specified as a certain $\Delta E$. A closest color match can also be determined using color bases having certain properties. For example, a set or subset of color bases can be used to produce an ink with properties selected from chemical resistance, lightfastness, radiation curable, heat resistance, foil stampability, UV-coatable, laser imprintable and combinations of these. The information input along with the desired color can include whether such specific property is needed in the ink. If a certain property such as chemical resistance is specified, then the system of the invention uses only those ink color bases designated for that property in determination the ink formulation.

The ink formulation identified with the input color can be saved in a database in connection with the print buyer information supplied by the customer, the customer's identity and order information, date of approval by the printer, print buyer, or designer, or other information.

In the case in which a formulation has been identified for a first type of ink, for example an offset ink, and the same color is desired for a second type of ink, for example a gravure ink, the color data for the first type of ink is the desired color and the same process is followed for determining a formulation for the second type of ink using base ink colors of that type of ink.

Additional information can be input to the program that determines the matching formulation to assure color match and ink performance for the specific printing job. It is known, for example, that color can vary for an ink depending upon the substrate being printed. For example, an ink may appear to have a different color when printed on a colored substrate as compared to a white substrate, or when printed on a different grade of paper, when the stock is coated as compared to uncoated, the desired thickness of the print layer, or when printed on a plastic or metal substrate as compared to paper. The calculation of the formulation preferably takes into account the color shift, if any, expected for the substrate being printed. The types of parameters than may be taken into account in the calculation of the formulation may include, for example and without limitation, substrate type, substrate color (which may also be input as spectral data or selected in any of the ways already discussed in connection with inputting the desired ink color), absorption of the substrate, paper weight when the substrate is paper, whether a paper or paperboard substrate is coated or uncoated, and so on.

The identified ink formulation is then transmitted to manufacturing equipment. The manufacturing equipment may include, for example, an automated dispensing system that dispenses the correct amount of each base color in the ink formulation to make an ink. The automated dispensing system may be connected electronically to the program that receives the customer's data and determined the correct ink formulation. The dispensing system may also be controlled by inputting information by hand, such as through a keyboard. The manufactured ink is then shipped to the customer. The system may include further components related to manufacturing, such as labeling software, inventory software and financial software. Such components are known in the art and need not be described further.

By using the system of the invention, the time needed to match a customer's color, produce an ink of the correct color, and ship the ink to the customer is greatly reduced over the current process in which the customer sends a color sample to the ink manufacturer, who develops a formula for an ink that matches the color of the sample, and finally manufactures the formula and sends the ink to the customer.

In one preferred embodiment, the system provides inks for offset lithographic equipment, including sheetfed printing equipment and web printing equipment, although the invention can be applied to inks for other types of processes, such as gravure, flexography, and silk screen printing processes. The ink can be radiation curing (including UV curing and electron beam curing), air dry, cold set (absorption inks such as newsink), heat set, waterborne, or solventborne inks.

For example and without limitation, a base color set used to produce lithographic inks may include a set of different ink colors having the same varnish or vehicle system that can be blended to yield a wide range of colors. The base color set typically includes at least about twelve base colors and may include 40 or more base colors. While increased numbers of base colors increase the complexity of the dispensing and mixing system, increased numbers of base colors also enhances the ability of the system to closely match customer colors and to meet customer demands for specific ink properties such as light-fast colors, heat resistant colors, and chemical resistant colors.

In a preferred embodiment, the varnish for the base color set is preferably selected for good printing characteristics on a variety of printing presses.

In another embodiment of the invention, the viscosity or other properties of the color-matched ink can be adjusted to suit a particular printing press, for example by adjusting the additive package in the ink or by adjusting the ratio of different varnish resins in the ink. Such adjustments can be made depending upon press design and configuration, type of fountain solution or printing plates in lithographic printing processes, and so on.

Many kinds of printed materials may be made by the process of the invention, including informational and sales brochures, insert advertisements, magazines, catalogs, company financial statements and annual reports, packaging materials including cartons, other containers, and labels, and so on.

The invention has been described in detail with reference to preferred embodiments thereof. It should be understood, however, that variations and modifications can be made within the spirit and scope of the invention and of the following claims.

What is claimed is:

1. A system for providing matching print colors for different ink customer orders, comprising:
   a first computer that can communicate with a second computer, said first computer comprising
   (a) a database of data for predicting color data of ink formulations using an ink base color set,
   (b) a software program for selecting an ink formulation based on data for a desired ink, and
   (c) a software program for sending information to the second computer to display the color of the selected ink formulation on a color monitor connected to the second computer.

2. A system according to claim 1, further comprising an automated dispensing machine digitally connected to said first computer for receiving said selected ink formulation from said first computer and manufacturing an ink of said ink formulation.

3. A system according to claim 2, wherein said ink that is manufactured is a lithographic ink.

4. A system according to claim 1, wherein said first computer calculates data of said desired ink color to the server in L*, a*, b*-type coordinates.

5. A system according to claim 1, wherein said first computer can communicate with said second computer using a global communication network.

6. A system according to claim 1, wherein said data for a desired ink is selected from the group consisting of type of substrate, color of substrate, print process, printing equipment, desired ink cost, at least one desired ink property, and combinations thereof.

7. A system according to claim 1, wherein the software program of (c) sends information to the second computer to display the color of the selected ink formulation in a selected kind of lighting.

8. A system according to claim 1, wherein said first computer further includes a software program for modifying the selected ink formulation according to further data input from said second computer.

9. A system according to claim 1, wherein said base color set is a lithographic ink base color set.

10. A system according to claim 1, where in said first computer further includes a program that identifies the selected ink formulation with a code and stores the formulation and code information.

11. A system according to claim 1, wherein said base color set includes base colors for inks having a property selected from the group consisting of chemical resistance, lightfastness, radiation curable, heat resistance, foil stampability, UV-coatable, laser imprintable and combinations of these.

12. A method for making an ink of a desired color, comprising steps of:
   receiving color information for the desired ink color by a first computer from a second computer, wherein said first computer and said second computer are connected by a global communication network;
   accessing with the first computer a database of available ink colors;
   comparing the desired ink color with colors of ink formulations and selecting an ink formulation within a selected color difference;
   providing the ink formulation from the first computer to a third computer in communication with the first computer;
   manufacturing an ink according to the ink formulation received by the third computer.

13. A method according to claim 12, wherein said manufacturing step is carried out by automated dispensing equipment connected to the third computer.

14. A method according to claim 2, wherein the ink manufactured is a lithographic ink.

15. A method according to claim 12, wherein the ink that is manufactured is a flexographic ink.

16. A method according to claim 12, wherein the ink that is manufactured is a gravure ink.

17. A method of printing on a substrate, comprising steps of making an ink according to claim 12 and printing the ink on the substrate using an offset printing process.

18. A method of printing on a substrate, comprising steps of making an ink according to claim 12 and printing the ink on the substrate using a flexographic printing process.

19. A method of printing on a substrate, comprising steps of making an ink according to claim 12 and printing the ink on the substrate using a gravure printing process.

* * * * *